US011903884B2

(12) United States Patent
Goldsbury

(10) Patent No.: US 11,903,884 B2
(45) Date of Patent: Feb. 20, 2024

(54) CUSTOMIZABLE MEMORABILIA COVER

(71) Applicant: Isabelle Gladys Goldsbury, Nanaimo (CA)

(72) Inventor: Isabelle Gladys Goldsbury, Nanaimo (CA)

(73) Assignee: Isabelle Gladys Goldsbury, Nanaimo (CA)

( * ) Notice: Subject to any disclaimer, the term of this patent is extended or adjusted under 35 U.S.C. 154(b) by 289 days.

(21) Appl. No.: 17/483,666

(22) Filed: Sep. 23, 2021

(65) Prior Publication Data

US 2022/0142847 A1 May 12, 2022

Related U.S. Application Data

(60) Provisional application No. 63/110,934, filed on Nov. 6, 2020.

(51) Int. Cl.
*A61G 17/08* (2006.01)
*A47G 1/06* (2006.01)
(Continued)

(52) U.S. Cl.
CPC ............... *A61G 17/08* (2013.01); *A47G 1/06* (2013.01); *G09F 9/30* (2013.01); *G09F 23/00* (2013.01)

(58) Field of Classification Search
CPC .......... A61G 17/08; A61G 1/06; A61G 33/00; A61G 2205/20; A61G 2205/60; B42D 3/12; G09F 9/30; G09F 23/00
(Continued)

(56) References Cited

U.S. PATENT DOCUMENTS 2,009,724 A * 7/1935 Bircher ................. E04H 13/006 40/124.5
3,167,844 A * 2/1965 Bachofner ............. A61G 17/08 27/1
(Continued)

FOREIGN PATENT DOCUMENTS

CA 3134243 A1 * 5/2022 ............... A47G 1/06
CN 2176242 Y * 9/1994
(Continued)

*Primary Examiner* — William L Miller
(74) *Attorney, Agent, or Firm* — Ward Law Office LLC; Jacob M. Ward

(57) ABSTRACT

A customizable memorabilia cover has front and back substantially rectangular leafboard members coupled to a spine member. Elastic bands may be coupled one each at the distal and proximal ends of the elastic bands substantially to the outer corners of the rectangular leafboard members. The elastic bands are disposed acutely from the edges of the rectangular leafboard members and designed to receive the corners of a book cover of a book therethrough, the book contained within the front and back leafboard members substantially abutted by the spine member. At least one groove member of the front leafboard member has a closed base and closed side members. A substantially transparent cover member is contiguously coupled to a top portion of the side members to define an ash container assembly. An alternative embodiment includes a covering or enclosing member that holds an electronic handheld device removably coupled to the back leafboard member.

20 Claims, 16 Drawing Sheets

(51) Int. Cl.
*G09F 9/30* (2006.01)
*G09F 23/00* (2006.01)

(58) Field of Classification Search
USPC ..................................................................... 27/1
See application file for complete search history.

(56) References Cited

U.S. PATENT DOCUMENTS

| | | | | | |
|---|---|---|---|---|---|
| 4,199,848 | A * | 4/1980 | Kohnert | A61G 17/08 | 27/1 |
| 7,096,546 | B2 * | 8/2006 | Poirier | A61G 17/08 | 27/1 |
| 7,934,298 | B1 * | 5/2011 | Ghazvini | A61G 17/08 | 40/124.5 |
| 8,341,812 | B2 * | 1/2013 | Kocir | A61G 17/0136 | 40/725 |
| D808,108 | S * | 1/2018 | Miwa | D99/5 | |
| 2004/0261236 | A1 * | 12/2004 | Poirier | A61G 17/08 | 27/1 |
| 2006/0207075 | A1 * | 9/2006 | Davis | A61G 17/08 | 27/1 |
| 2009/0101527 | A1 * | 4/2009 | Triolo | B42D 3/123 | 206/232 |

FOREIGN PATENT DOCUMENTS

| | | | | |
|---|---|---|---|---|
| CN | 114344068 | A * | 4/2022 | |
| CN | 115465007 | A * | 12/2022 | |
| GB | 2561284 | A * | 10/2018 | E04H 13/00 |
| JP | 2012016467 | A * | 1/2012 | |
| JP | 2017131209 | A * | 8/2017 | |
| JP | 2019154522 | A * | 9/2019 | |

* cited by examiner

CUSTOMIZABLE MEMORABILIA COVER

CLAIM OF PRIORITY

This application claims priority to and the benefit of U.S. Provisional application with Ser. No. 63/110,934, filed on Nov. 6, 2020, which is incorporated herein by reference in its entirety.

FIELD OF THE INVENTION

The inventive concept relates generally to integrating cremation ashes into a customizable memorabilia cover for a book.

BACKGROUND

Currently, there are a number of solutions for memorabilia for the dead. One of these solutions attempts to utilize photobooks, but this solution fails to meet the needs of the market because photobooks tend to be unorganized. Another solution attempts to utilize home videos, but this solution is similarly unable to meet the needs of the market because video formats can become obsolete. Still another solution seeks to utilize an urn, but this solution also fails to meet market needs because urns are not meant to be transported. Therefore, there currently exists a need in the market for an apparatus that stores a person or pet's ashes in a book cover.

SUMMARY OF THE INVENTION

A customizable memorabilia cover for integrating a person or pet's cremation ashes has front and back substantially rectangular leafboard members coupled at distal ends of the leafboard members to a spine member, the opposing inside surfaces of the front and back leafboard members, when in a substantially parallel state, spaced from each other by the spine member. The leafboard members may serve as a book cover. The leafboard members may substantially encase a book cover. In one embodiment, the pages of a book member such as a Bible are disposed between the leafboard members.

In one embodiment of the customizable memorabilia cover for integrating a person or pet's cremation ashes, four elastic band members are coupled one each at distal and proximal ends of the elastic band members substantially to the four proximal corners of the rectangular leafboard members. The elastic band members are disposed at an acute angle from the perpendicular contiguous edges of the rectangular leafboard members, the elastic band members designed to receive the corners of a book cover of a removable book therethrough, the outer surface of the book cover and book spine substantially contiguous with the inside surface of the leafboard members and an inside surface of the spine member. At least one groove member is disposed within an outer surface of the front leafboard member having a closed base and closed side members and a substantially open top. A substantially transparent cover member is contiguously coupled to a top portion of the side members to define an ash container assembly.

In one embodiment of the customizable memorabilia cover, at least one or more of letter, number, and design members are inlaid with at least one of the outer surface of the front leafboard member and an outer surface of the back leafboard member and spine member.

In one embodiment of the customizable memorabilia cover, a color or glitter element disposed within the ash container assembly is designed to be disposed with ash and to match or complement the color of the customizable memorabilia cover.

In one embodiment of the customizable memorabilia cover, a bookmark member is included and is removably disposable within the book member disposed within the customizable memorabilia cover, a bookmark ash container assembly disposed within the bookmark member, the bookmark ash container assembly with at least one transparent front or back closed surface.

In one embodiment of the customizable memorabilia cover, at least one photographic frame member or electronic display is disposed on the outer surface of the front rectangular leafboard member.

In one embodiment of the customizable memorabilia cover, the book member is an electronic book.

Added is an embodiment of the customizable memorabilia cover wherein at least one or more of a pocket and sleeve member on either or both the front inside surface of the memorabilia cover or the back inside surface of the memorabilia cover is adapted to retain an electronic storage medium device. In the preferred embodiment, the electronic medium would be a gold plated, corrosion resistant DVD designed for 100-year plus archiving. Other electronic storage medium may be used.

Added is an embodiment of the customizable memorabilia cover, wherein the customizable memorabilia cover is adapted to contain a computerize handheld device. In this embodiment, front and back substantially rectangular leafboard members are coupled at distal ends of the leafboard members to a spine member, the opposing inside surfaces of the front and back leafboard members, when in a substantially parallel state, spaced from each other by the spine member. Two elastic band members are coupled one each at distal and proximal ends of the elastic band members substantially to the two proximal corners of the back rectangular leafboard member wherein the elastic band members are disposed at an acute angle from the perpendicular contiguous edges of the back rectangular leafboard member, the elastic band members adapted to receive the corners of a handheld computerized device therethrough, the back surface of the handheld computerized device substantially contiguous with the inside surface of the back leafboard member. A handheld computerized device includes such devices as a cellphone, smartphone, laptop, or tablet computer.

Added is an embodiment of the customizable memorabilia cover wherein the computerized handheld device includes augmented reality. Augmented reality integrates elements that could appear—when using augmented reality readers such as specialized glasses or viewing a screen associated with the computerized handheld device—to allow images to appear outside the electronic device such as the loved one standing beside the user. Added is an embodiment that is an augmented reality book wherein an otherwise conventional book has augmented reality capabilities installed therein.

Added is an embodiment of the customizable memorabilia cover wherein the customizable memorabilia cover is also the cover of the book member. Added is an embodiment wherein the sleeve members are used in place of band members to hold the cover of the book member in place.

Added is an embodiment wherein a ribbon member is adapted to receive a person or pet's cremation ashes at least one or more of integrated into the ribbon member or contained and covered within a polymer material coupled to the ribbon member.

It would be advantageous to have a customizable memorabilia cover that is portable or a portable keepsake or notebook.

The inventive concept advantageously fills the aforementioned deficiencies by providing a customizable memorabilia cover, which provides a way for people to retain at least a portion of a person or pet's ashes after cremation.

The customizable memorabilia cover has an ash storage compartment. The customizable memorabilia cover may have a personal information tab. The customizable memorabilia cover provides an alternative to the traditional urn.

In one example embodiment, the memorabilia cover device includes a compartment and assembly that plays an audio and/or video recording such as an mp3 file or electronic audio file that includes but is not limited to the decedent person speaking, or a favorite audio sound, script or saying that plays automatically or manually when the memorabilia cover device is opened. In a related embodiment, the audio and/or video file would be a short recording of a loved from while they are alive. Such a file could be put/inserted in a book or a Bible, so along with the ashes you would hear their voice.

Among other things, it is an advantage of the inventive concept to provide a customizable memorabilia cover that does not suffer from problems or deficiencies associated with prior solutions.

It is still further an advantage of the customizable memorabilia cover to be durable.

Still further, the customizable memorabilia cover may have a photo frame. Added is a photo frame that may include the cremation ashes of a pet or a person and may further include glitter or another design element.

The inventive concept now will be described more fully hereinafter with reference to the accompanying drawings, which are intended to be read in conjunction with both this summary, the detailed description, and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

DETAILED DESCRIPTION OF THE INVENTION

Figure 1:
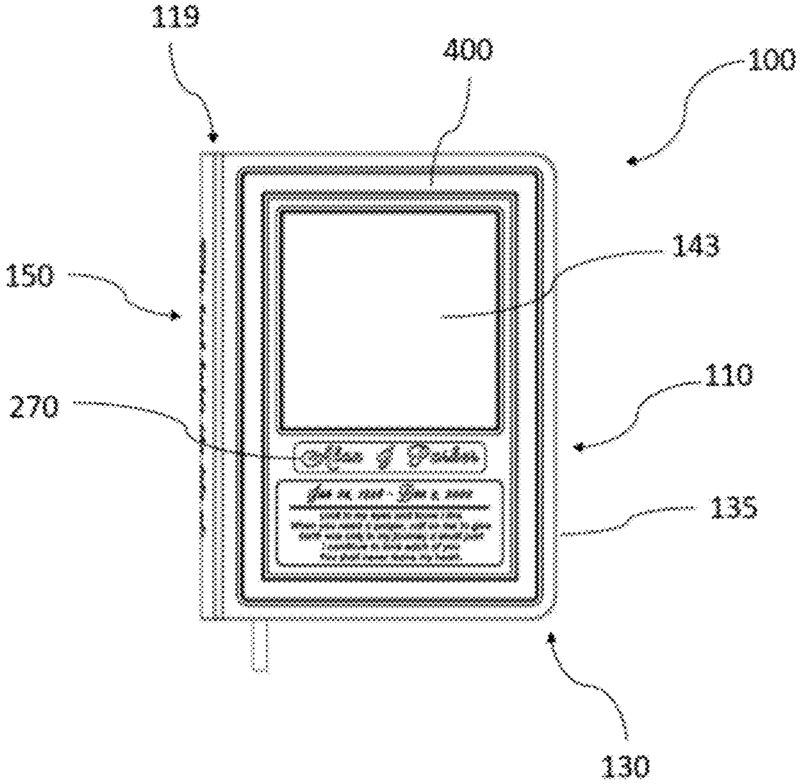
FIG. 1 illustrates a front view of the customizable memorabilia cover.
Figure 2:
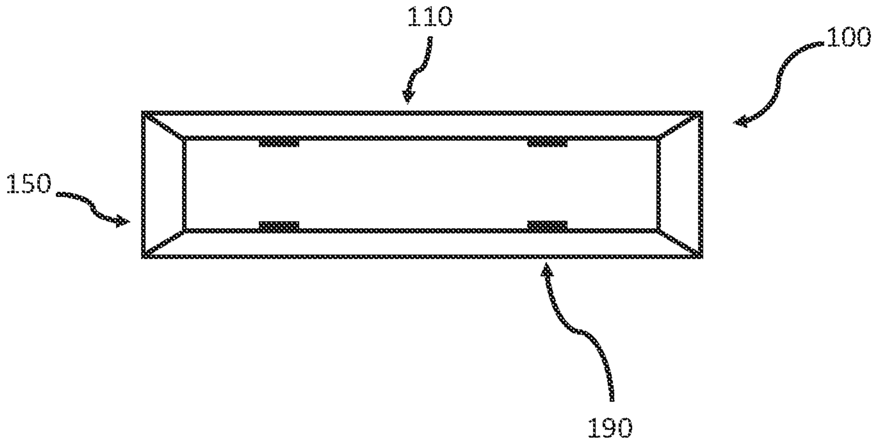
FIG. 2 illustrates a top view of the customizable memorabilia cover.
Figure 3:
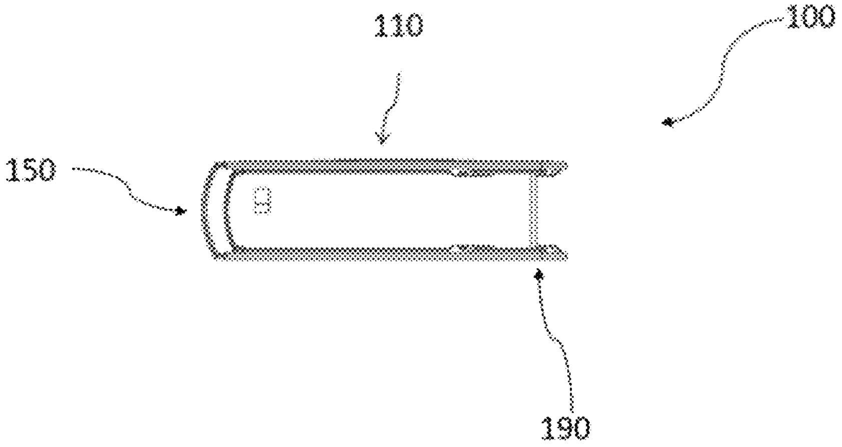
FIG. 3 illustrates a bottom view of the customizable memorabilia cover.
Figure 4:
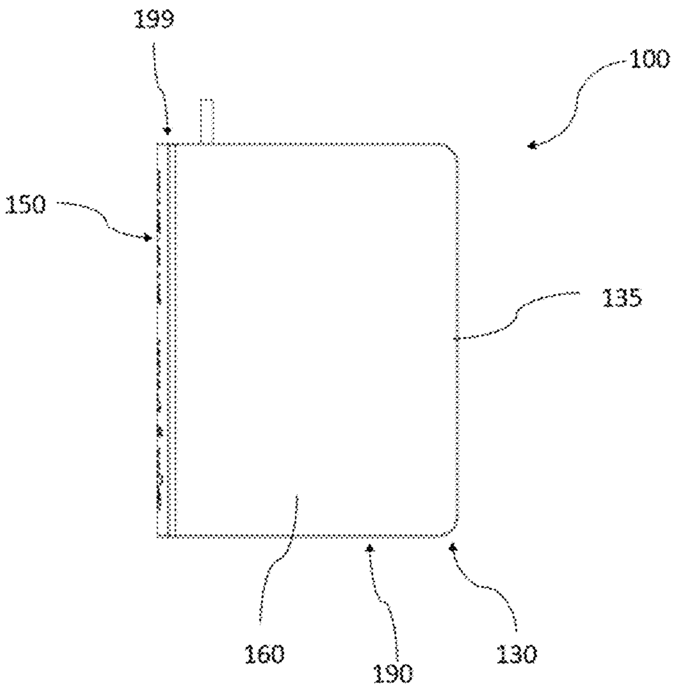
FIG. 4 illustrates a back view of the customizable memorabilia cover.
Figure 5:
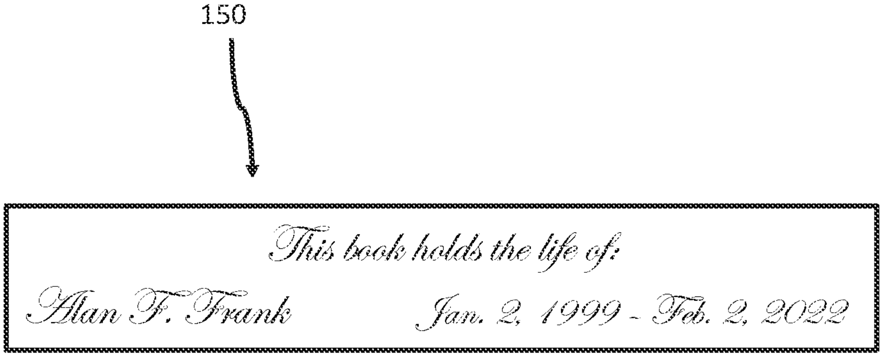
FIG. 5 illustrates a spine member of the customizable memorabilia cover.
Figure 6:
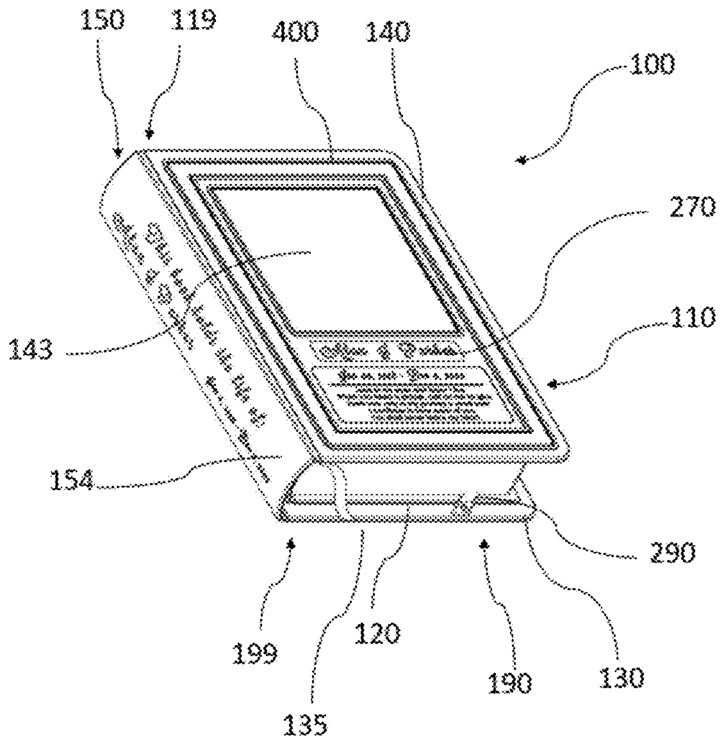
FIG. 6 illustrates a perspective view of the customizable memorabilia cover.
Figure 7:
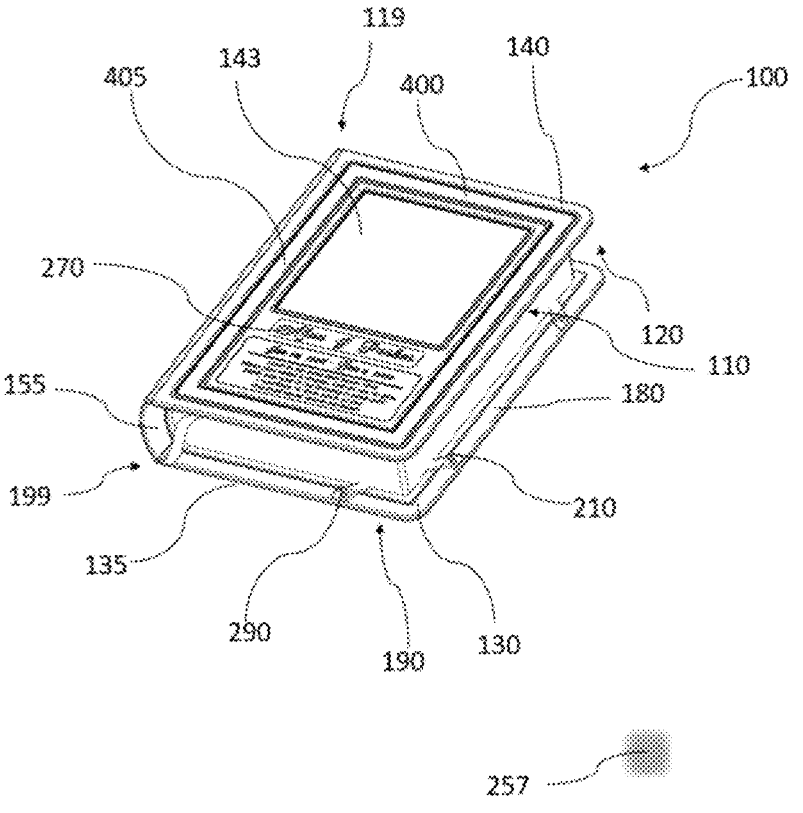
FIG. 7 illustrates a second perspective view of the customizable memorabilia cover.
Figure 8:
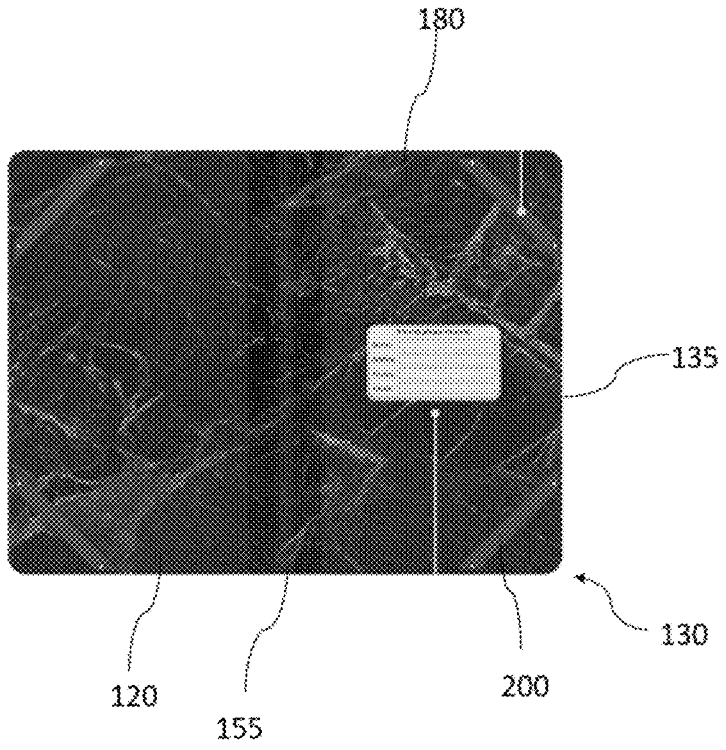
FIG. 8 illustrates inside surfaces of the customizable memorabilia cover.
Figure 9A:
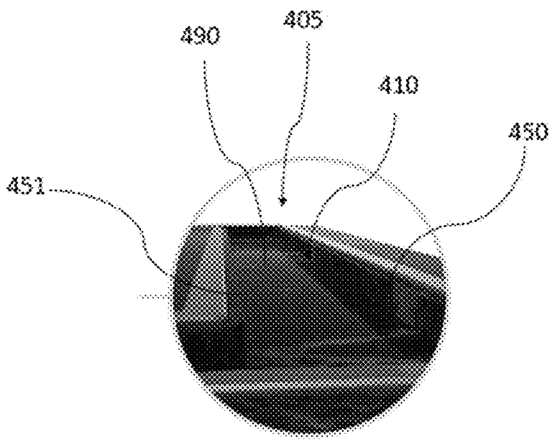
FIG. 9A illustrates an ash remains container assembly
Figure 9B:
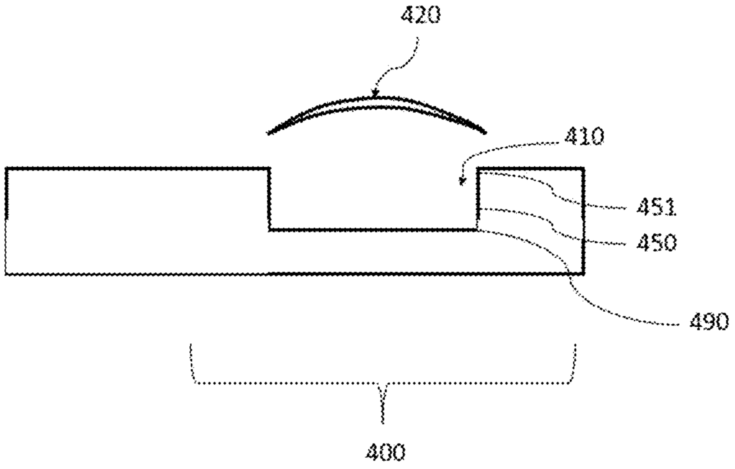
FIG. 9B illustrates a cross-section of the ash or ash remains container assembly
Figure 10:
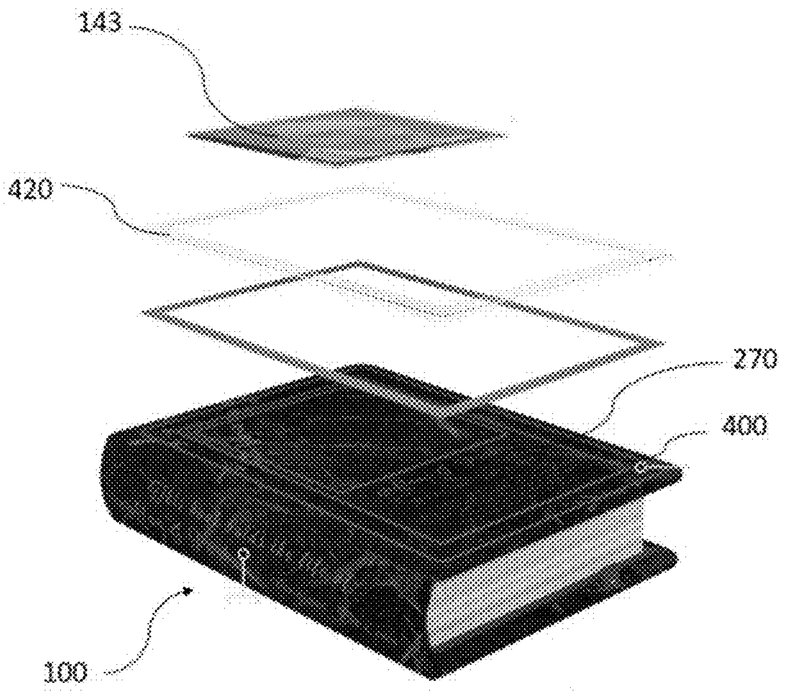
FIG. 10 illustrates a view of an assembly of the ash container assembly and the photo assembly.
Figure 11A:
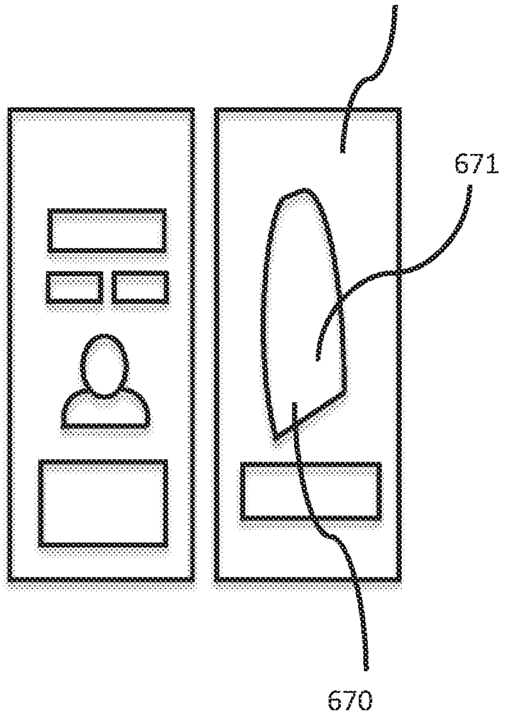
FIG. 11A illustrates a front view of a bookmark member.
Figure 11B:
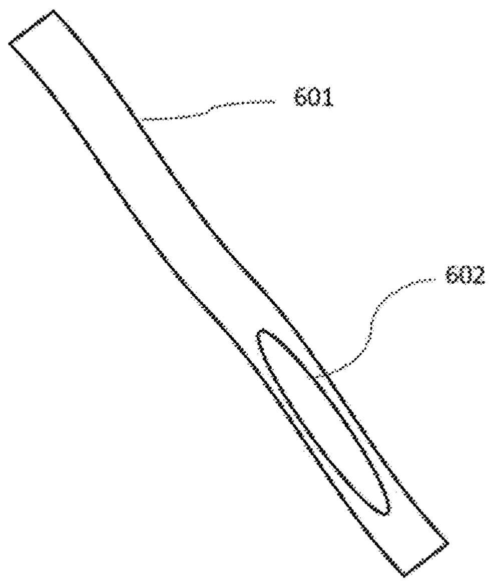
FIG. 11B illustrates a ribbon member.

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

FIGS. 1-11 illustrate an example embodiment of a customizable memorabilia cover 100 that has a front substantially rectangular leafboard member 110 and back substantially rectangular leafboard member 190 coupled at respective distal ends of the leafboard members 119, 199 to a spine member 150, respective opposing inside surfaces of the front and back leafboard members 120, 180 when in a substantially parallel state, spaced from each other by the spine member 150. Four elastic band members 200 may be coupled one each at distal and proximal ends 290, 210 of the elastic band members 200 substantially to the four proximal corners 130 of the rectangular leafboard members 110, 190.

FIGS. 1-11 further illustrate that the elastic band members 200 are disposed at an acute angle from the perpendicular contiguous edges of the rectangular leafboard members 135, the elastic band members 200 designed to receive the corners of a book cover of a removable book therethrough, an outer surface of the book cover and book spine substantially contiguous with the inside surface of the leafboard members 120, 180 and an inside surface of the spine member 155. At least one groove member 400 is disposed within an outer surface of the front leafboard member 140 having a closed base 490 and closed side members 450 and a substantially open top 410. A substantially transparent cover member 420 is contiguously coupled to a top portion of the side members 451 to define an ash container assembly 405.

FIGS. 1-11 further illustrate one embodiment of the customizable memorabilia cover, at least one or more of letter, number, and design members 270 are inlaid with at least one of the outer surface of the front leafboard member 140 and an outer surface of the back leafboard member 160 and outer surface of the spine member 154.

FIGS. 1-11 further illustrate that in this embodiment of the customizable memorabilia cover, a color or glitter element 257 is disposed within the ash container assembly 405 and is designed to be disposed with ash and match or complement the color of the customizable memorabilia cover 100.

FIGS. 1-11 further illustrate one embodiment of the customizable memorabilia cover wherein a bookmark member 600 is included removably disposable within book member disposed within the customizable memorabilia cover, a bookmark ash container assembly 670 disposed within the bookmark member 600, the bookmark ash container assembly 670 with at least one transparent front or back closed surface 671. In another embodiment, the bookmark member 600 could be integrated into the book member.

FIGS. 1-11 further illustrate that in this embodiment of the customizable memorabilia cover, at least one photographic frame member 143 is disposed on the outer surface of the front rectangular leafboard member 140.

FIG. 1-11 illustrates an added ribbon member 601 with at least one transparent front or back closed surface 602.

Figure 12A:
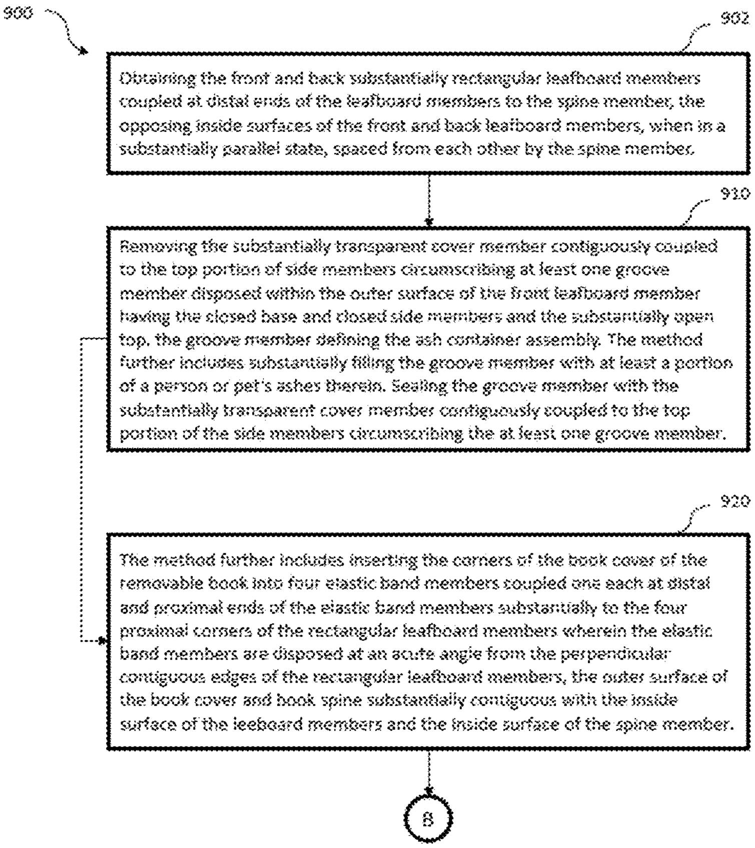
FIG. 12A and 12B illustrate a method for using the customizable memorabilia cover.
Figure 12B:
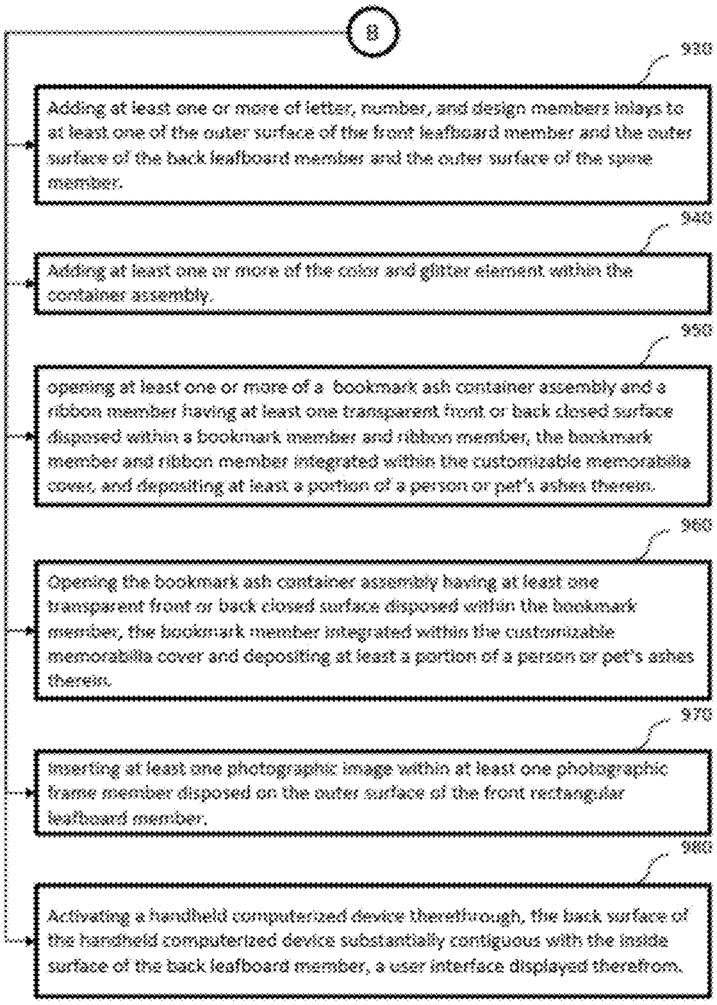

FIGS. 12A-12B illustrate a method 900 for integrating a person or pet's cremation ashes or ash remains (or other personal keepsake, such as a lock of hair, a piece of jewelry, or other item of personal value) into a customizable memorabilia cover. The method 900 includes step 902 of providing the front and back substantially rectangular leafboard members 110, 190 coupled at distal ends of the leafboard members 119, 199 to the spine member, the opposing inside surfaces of the front and back leafboard members 120, 180, when in a substantially parallel state, spaced from each other by the spine member 150. The method further includes step 910 removing the substantially transparent cover member 420 contiguously coupled to the top portion of side members 451 circumscribing at least one groove member 400 disposed within the outer surface of the front leafboard member 140 having the closed base 490 and closed side members 450 and the substantially open top, the groove member 400 defining the ash container assembly 405.

FIGS. 12A-12B illustrate that the method step 910 further includes substantially filling the groove member 400 with at least a portion of a person or pet's ashes therein. The method further includes sealing the groove member 400 with the substantially transparent cover member 420 contiguously coupled to the top portion of the side members circumscribing the at least one groove member 400. The illustrated method may take place via at least one or more of a funeral home, a manufacturer, other businesses, and persons associated with the receivers of the ashes.

FIGS. 12A-12B illustrate that the method may further include 920 inserting the corners of the book cover of the removable book into four elastic band members 200 coupled one each at distal and proximal ends of the elastic band members 200 substantially to the four proximal corners 130 of the rectangular leafboard members wherein the elastic band members 200 are disposed at an acute angle from the perpendicular contiguous edges of the rectangular leafboard members 135, the outer surface of the book cover and book spine substantially contiguous with the inside surface of the leeboard members 120, 180 and the inside surface of the spine member 155.

FIGS. 12A-12B illustrate that the method for integrating a person or pet's cremation ashes into a customizable memorabilia cover 100 may further include step 930 adding at least one or more of letter, number, and design members inlays 270 to at least one of the outer surface of the front leafboard member 140 and the outer surface of the back leafboard member 160 and the outer surface of the spine member 154.

FIGS. 12A-12B illustrate that the method for integrating a person or pet's cremation ashes into a customizable memorabilia cover 100 may further include step 940 adding at least one or more of the color and glitter element 257 within the container assembly 405.

FIGS. 12A-12B illustrates that the method for integrating a person or pet's cremation ashes into a customizable memorabilia cover 100, may further include step 950 opening the bookmark ash container assembly 670 having at least one transparent front or back closed surface disposed within the bookmark member 600, the bookmark member 600 removably disposable within the customizable memorabilia cover 100, and depositing at least a portion of a person or pet's ashes therein.

FIGS. 12A-12B illustrate that the method for integrating a person or pet's cremation ashes into a customizable memorabilia cover 100 may further include step 960 opening the bookmark ash container assembly 670 having at least one transparent front or back closed surface 671 disposed within the bookmark member 600, the bookmark member 600 integrated within the customizable memorabilia cover 100, and depositing at least a portion of a person or pet's ashes therein.

FIGS. 12A-12B illustrate that the method for integrating a person or pet's cremation ashes into a customizable memorabilia cover 100 may further include step 970 inserting at least one photographic image (or electronic display) within at least one photographic frame member disposed on the outer surface of the front rectangular leafboard member 110.

FIGS. 12A-12B illustrate that the method for integrating a person or pet's cremation ashes into a customizable memorabilia cover 100, in another embodiment, may further include step 980 activating a handheld computerized device 700 therethrough, the back surface of the handheld computerized device 700 substantially contiguous with the inside surface of the back leafboard member 180, a user interface displayed therefrom.

Figure 13:
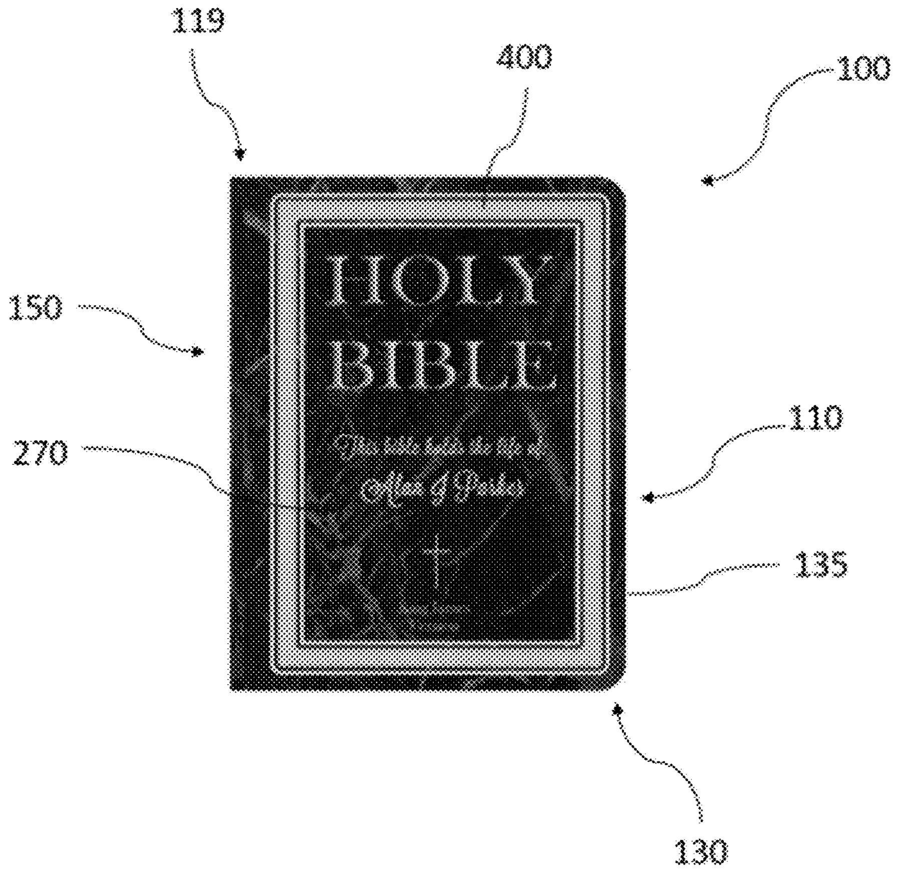
FIG. 13 illustrates a view of the customizable memorabilia cover wherein the book member is a Bible.

FIG. 13 illustrates a version of the inventive concept wherein the book member is a bible and the customizable memorabilia cover 100 denotes a Bible.

Figure 14:
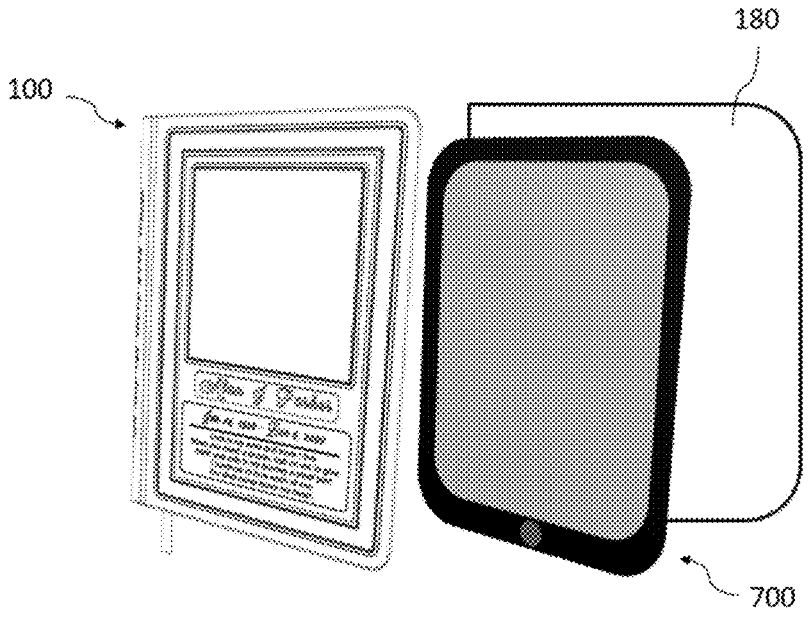
FIG. 14 illustrates a handheld computerized device inside surface of the back leafboard member.

FIG. 14 illustrates the handheld computerized device 700 designed to be substantially contiguous with the inside surface of the back leafboard member 180.

The following patents are incorporated by reference in their entireties: U.S. Pat. Nos. 4,023,316, 5,158,174, and 7,178,209.

While the invention has been described above in terms of specific embodiments, it is to be understood that the invention is not limited to these disclosed embodiments. Upon reading the teachings of this disclosure, many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. A customizable memorabilia cover for integrating a person or pet's cremation ash remains into or around a book or notebook comprising:

front and back substantially rectangular leafboard members coupled at distal ends thereof to a spine member, opposing inside surfaces of the front and back leafboard members, when in a substantially parallel state, spaced from each other by the spine member;

at least one groove member disposed within an outer surface of the front leafboard member having a closed base and closed side members and a substantially open top; and a substantially transparent cover member contiguously coupled to a top portion of the side members to define a cremation ash remains container assembly.

2. The customizable memorabilia cover of claim 1 wherein a set of four elastic band members are disposed on the inside surface of the leafboard members of the customizable memorabilia cover, distal and proximal ends of the elastic band members coupled one each substantially to the four proximal corners of the rectangular leafboard members wherein the elastic band members are disposed at an acute angle from the perpendicular contiguous edges of the rectangular leafboard members, the elastic band members adapted to receive corners of the book or notebook therethrough, an outer surface of the book or notebook and its spine member substantially contiguous with the inside surface of the leafboard members and an inside surface of the spine member.

3. The customizable memorabilia cover of claim 1 wherein at least one or more of letter, number, and design members are inlaid with at least one of the outer surface of the front leafboard member and an outer surface of the back leafboard member and the spine member.

4. The customizable memorabilia cover of claim 1 wherein a color or glitter element disposed within the cremation ash remains container assembly is adapted to be disposed with the cremation ash remains and adapted to match or complement a color of the customizable memorabilia cover.

5. The customizable memorabilia cover of claim 1 wherein a bookmark member is removably disposable within the book disposed within the customizable memorabilia cover, a bookmark ash container assembly disposed within the bookmark member, the bookmark ash container assembly with at least one transparent front or back closed surface.

6. The customizable memorabilia cover of claim 1 wherein a ribbon member is integrated into the book disposed within the customizable memorabilia cover, at least one or more of the person or pet's cremation ash remains integrated into a ribbon ash container assembly disposed within the ribbon member, the ribbon ash container assembly with at least one transparent front or back closed surface.

7. The customizable memorabilia cover of claim 1 wherein at least one photographic or image frame member or electronic display is disposed on the outer surface of the front rectangular leafboard member.

8. The customizable memorabilia cover of claim 1 wherein the book or notebook includes at least one or more of a book member, an electronic book, and an augmented reality book.

9. The customizable memorabilia cover of claim 1 further comprising one of a pocket and sleeve member adapted to retain an electronic storage medium device on the inside surface of one of the front and back leafboard members.

10. A customizable memorabilia cover for integrating a person or pet's cremation ash remains into or around a case for a handheld computerized device comprising:

front and back substantially rectangular leafboard members coupled at distal ends of the leafboard members to a spine member, opposing inside surfaces of the front and back leafboard members, when in a substantially parallel state, spaced from each other by the spine member;

at least two elastic band members, distal and proximal ends of the elastic band members coupled substantially to the two proximal comers of the back rectangular leafboard member wherein the elastic band members are disposed at an acute angle from perpendicular contiguous edges of the back rectangular leafboard member, the elastic band members adapted to receive comers of the handheld computerized device therethrough, a back surface of the handheld computerized device substantially contiguous with the inside surface of the back leafboard member;

at least one groove member disposed within an outer surface of the front leafboard member having a closed base and closed side members and a substantially open top; and a substantially transparent cover member contiguously coupled to a top portion of the side members to define a cremation ash remains container assembly.

11. The customizable memorabilia cover of claim 10 wherein at least one or more of letter, number, and design members are inlaid with at least one of the outer surface of the front leafboard member and an outer surface of the back leafboard member and the spine member.

12. The customizable memorabilia cover of claim 10 wherein a color or glitter element disposed within the cremation ash remains container assembly is adapted to be disposed with the cremation ash remains and adapted to match or complement the color of the customizable memorabilia cover.

13. The customizable memorabilia cover of claim 10 wherein at least one image or photographic frame member is disposed on the outer surface of the front rectangular leafboard member.

14. A method for integrating a person or pet's cremation ash remains into a customizable memorabilia cover, the method comprising:

providing front and back substantially rectangular leafboard members coupled at distal ends of the leafboard members to a spine member, opposing inside surfaces of the front and back leafboard members, when in a substantially parallel state, spaced from each other by the spine member;

removing a substantially transparent cover member contiguously coupled to a top portion of closed side members circumscribing at least one groove member disposed within an outer surface of the front leafboard member having a closed base and the closed side members and a substantially open top, the groove member defining a cremation ash remains container assembly;

substantially filling the groove member with at least a portion of the person or pet's cremation ash remains therein; and sealing the groove member with the substantially transparent cover member contiguously coupled to the top portion of the closed side members circumscribing the at least one groove member.

15. The method of claim 14, the method further including inserting corners of a book cover of a removable book into four elastic band members coupled one each at distal and proximal ends substantially to the four proximal corners of the rectangular leafboard members wherein the elastic band members are disposed at an acute angle from the perpendicular contiguous edges of the rectangular leafboard members, an outer surface of the book cover and book spine substantially contiguous with the inside surface of the leafboard members and an inside surface of the spine member.

16. The method of claim 14, the method further including adding at least one or more of letter, number, and design member inlays with at least one of the outer surface of the front leafboard member and an outer surface of the back leafboard member and spine member.

17. The method of claim 14, the method further including adding at least one or more of a color and glitter element within the cremation ash remains container assembly.

18. The method of claim 14, the method further including opening a bookmark ash container assembly having at least one transparent front or back closed surface disposed within a bookmark member, the bookmark member removably disposable within the customizable memorabilia cover and depositing at least a portion of the person or pet's cremation ash remains therein.

19. The method of claim 14, the method further including opening at least one a bookmark ash container assembly and a ribbon member each having transparent front or back closed surface disposed within a bookmark member and the ribbon member, the bookmark member and ribbon member integrated within the customizable memorabilia cover, and depositing at least a portion of the person or pet's cremation ash remains therein.

20. The method of claim 14, the method further including inserting at least one photographic image or electronic display within at least one photographic frame member disposed on the outer surface of the front rectangular leaf-board member.

* * * * *